Figure 1:
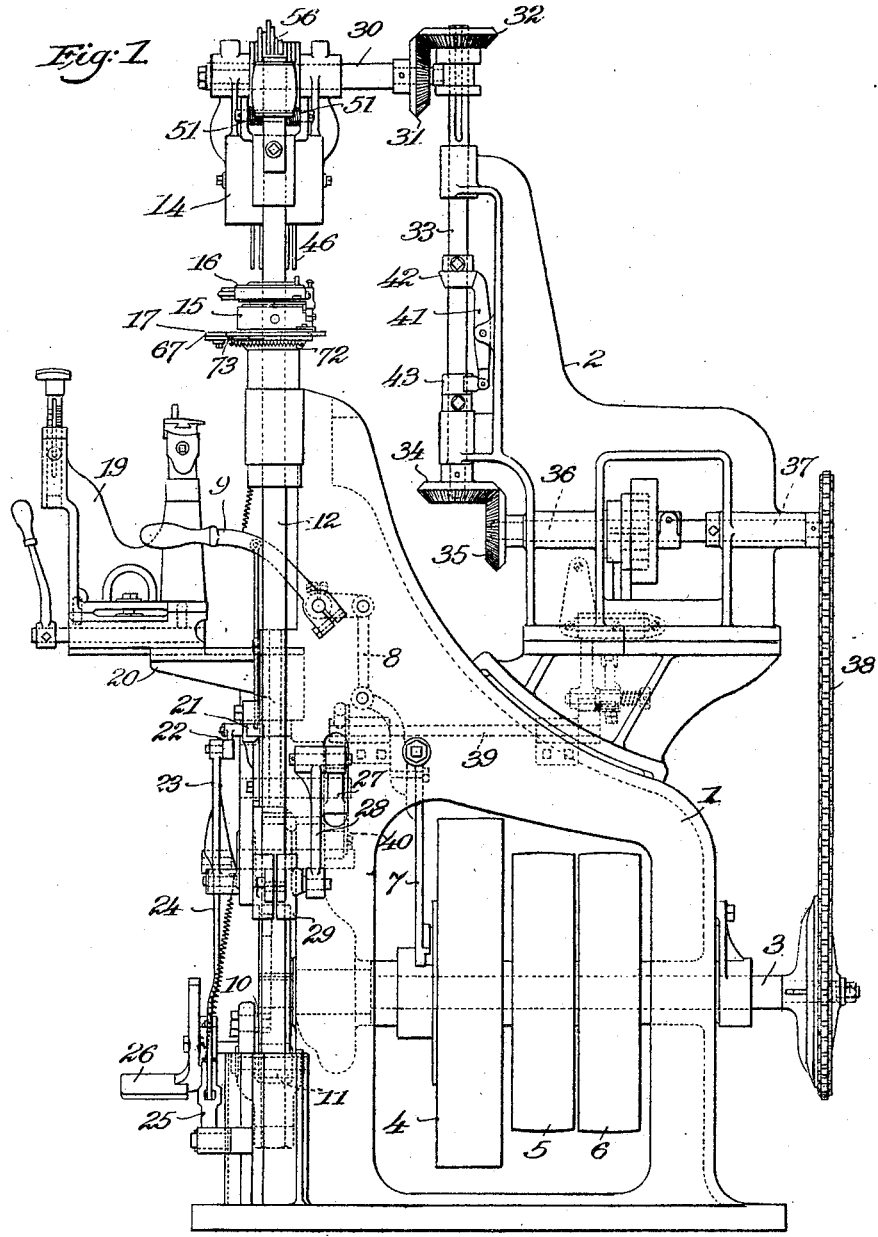

No. 798,594.  
PATENTED SEPT. 5, 1905.  
H. BRIGGS.  
HEEL NAILING MACHINE.  
APPLICATION FILED NOV. 7, 1903.

6 SHEETS—SHEET 1.

No. 798,594. PATENTED SEPT. 5, 1905.
H. BRIGGS.
HEEL NAILING MACHINE.
APPLICATION FILED NOV. 7, 1903.

6 SHEETS—SHEET 4.

Witnesses:
John F. L. Pruickert
Alfred H. Hildreth

Inventor:
Henry Briggs
by his Attorneys
Phillips Van Everen & Fish

No. 798,594. PATENTED SEPT. 5, 1905.
H. BRIGGS.
HEEL NAILING MACHINE.
APPLICATION FILED NOV. 7, 1903.
6 SHEETS—SHEET 6.
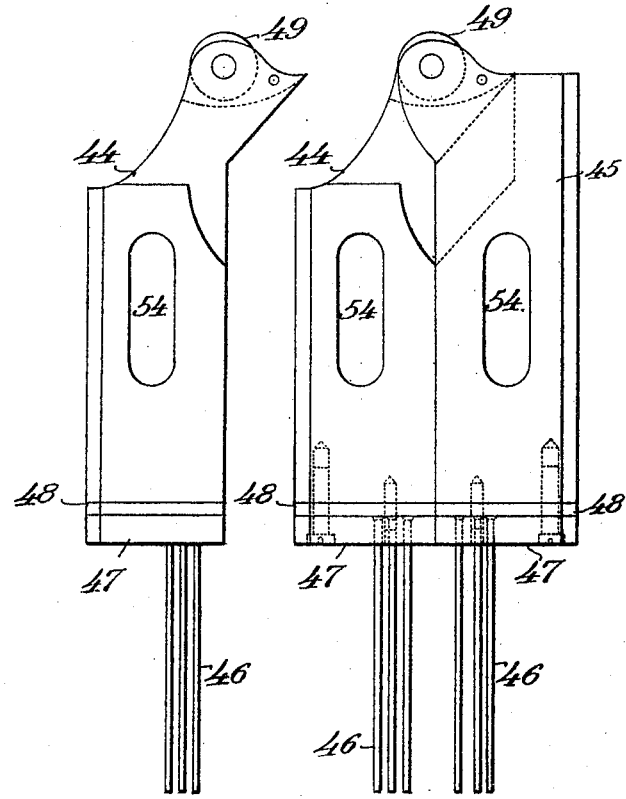
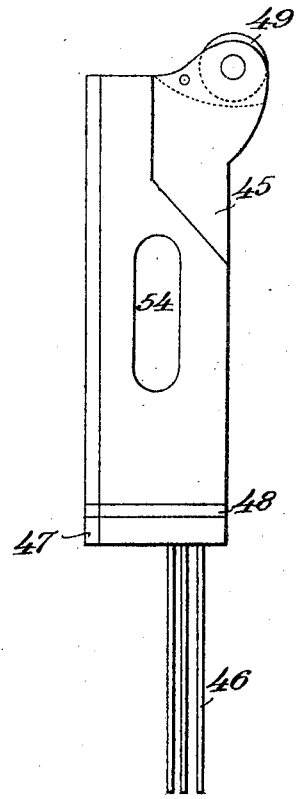

No. 798,594. PATENTED SEPT. 5, 1905.
H. BRIGGS.
HEEL NAILING MACHINE.
APPLICATION FILED NOV. 7, 1903.
6 SHEETS—SHEET 6.
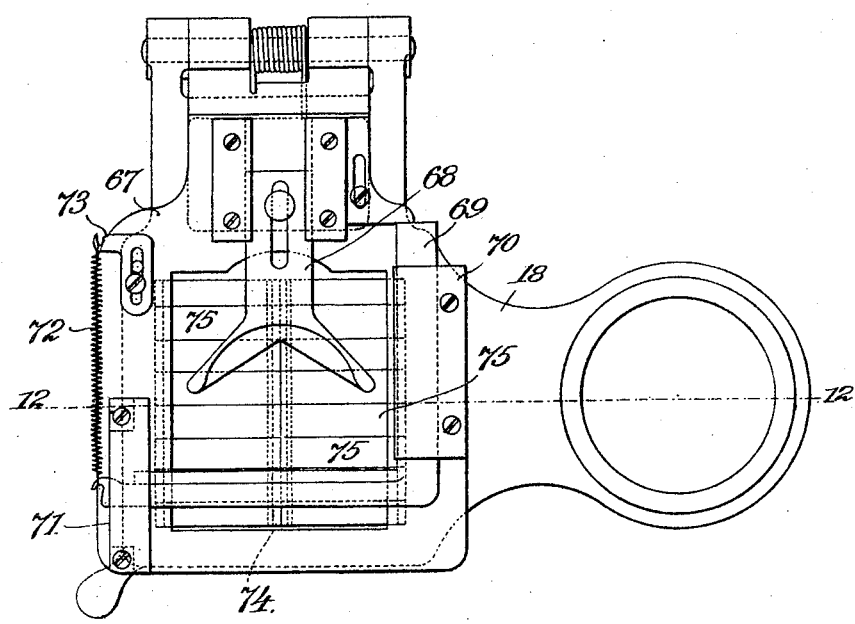
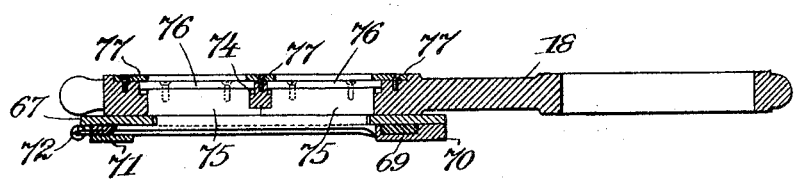

UNITED STATES PATENT OFFICE.

HENRY BRIGGS, OF HASBROUCK HEIGHTS, NEW JERSEY.

HEEL-NAILING MACHINE.

No. 798,594.　　　　Specification of Letters Patent.　　　　Patented Sept. 5, 1905.

Application filed November 7, 1903. Serial No. 180,152.

*To all whom it may concern:*

Be it known that I, HENRY BRIGGS, a citizen of the United States, residing at Hasbrouck Heights, in the county of Bergen and State of New Jersey, have invented certain new and useful Improvements in Heel-Nailing Machines; and I do hereby declare the following to be a full, clear, and exact description of the invention, such as will enable others skilled in the art to which it appertains to make and use the same.

The present invention relates to heel-nailing machines, and is intended, primarily, as an improvement on the heel-nailing machine disclosed in my prior application, Serial No. 100,443, filed March 28, 1902, although it is not limited thereto, but may be embodied in other forms of heel-nailing machines.

The machine disclosed in my prior application above referred to is provided with a nail-driving mechanism by which the heel-attaching nails can be driven without the use of the heavy pressure which is necessary when all the nails are driven simultaneously and without any liability of displacing the heel upon the shoe or of failing to press the heel firmly into contact with the sole of the shoe on both sides. This nail-driving mechanism is arranged to successively drive groups of the heel-attaching nails, each group containing nails upon each side of the heel. One of the objects of the present invention is to still further reduce the pressure required to drive the heel-attaching nails while insuring that the heel is not displaced upon the shoe and is firmly pressed into contact with the sole of the shoe on both sides, and with this object in view a feature of the present invention contemplates providing a nail-driving mechanism constructed and arranged to drive the heel-attaching nails singly and successively and to drive nails alternately on opposite sides of the heel. By driving the nails singly and successively less pressure is required than when the nails are driven in groups, and by driving nails alternately on opposite sides of the heel the heel is prevented from being displaced upon the shoe and is firmly pressed into contact with the sole on both sides. In accordance with this feature of my invention, broadly considered, the nail-driving mechanism may be constructed and arranged to drive first a nail on one side of the heel and then a nail on the other side or to drive a number of nails on one side and then one or more nails on the other side, it being essential only that the driving mechanism be constructed and arranged to drive nails alternately on opposite sides of the heel, so that displacement of the heel upon the shoe is prevented and a close contact of the heel with the sole of the shoe on both sides is insured. In this connection I desire to state that I believe I am the first to provide a nail-driving mechanism constructed and arranged to drive nails alternately upon opposite sides of the heel, and I therefore consider a feature of my invention to consist in providing a heel-nailing machine with such a nail-driving mechanism whether such mechanism is constructed and arranged to drive the nails singly or in groups, although I prefer to employ a mechanism by which the nails are driven singly, as thereby the pressure required is reduced to a minimum.

The heel-nailing machine disclosed in my prior application is also provided with means for forcing the top lift upon the heads of the heel-attaching nails progressively, the top lift being forced upon the heads of the nails two at a time, so that much less pressure is required than in prior machines, by which the top lift is forced upon the heads of the nails simultaneously. Another object of the present invention is to still further reduce the pressure required to attach the top lift, and with this object in view a feature of my invention contemplates providing a heel-nailing machine with means for forcing the top lift upon but one nail at a time.

In addition to the features of the invention above referred to the present invention also consists in certain devices, combinations, and arrangement of parts hereinafter described and claimed, the advantages of which will be obvious to those skilled in the art.

The various features of the present invention will be clearly understood from the accompanying drawings, in which—

Figure 2:
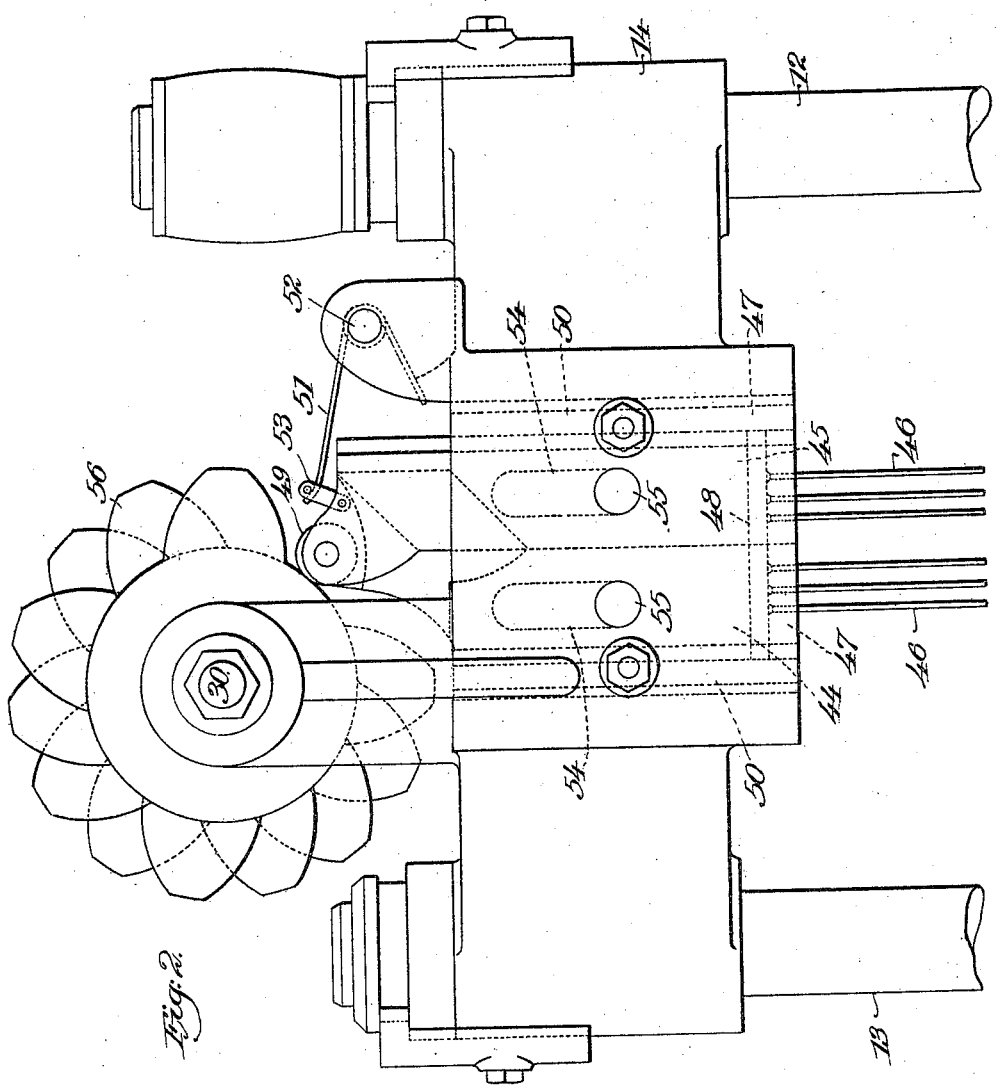
Figure 3:
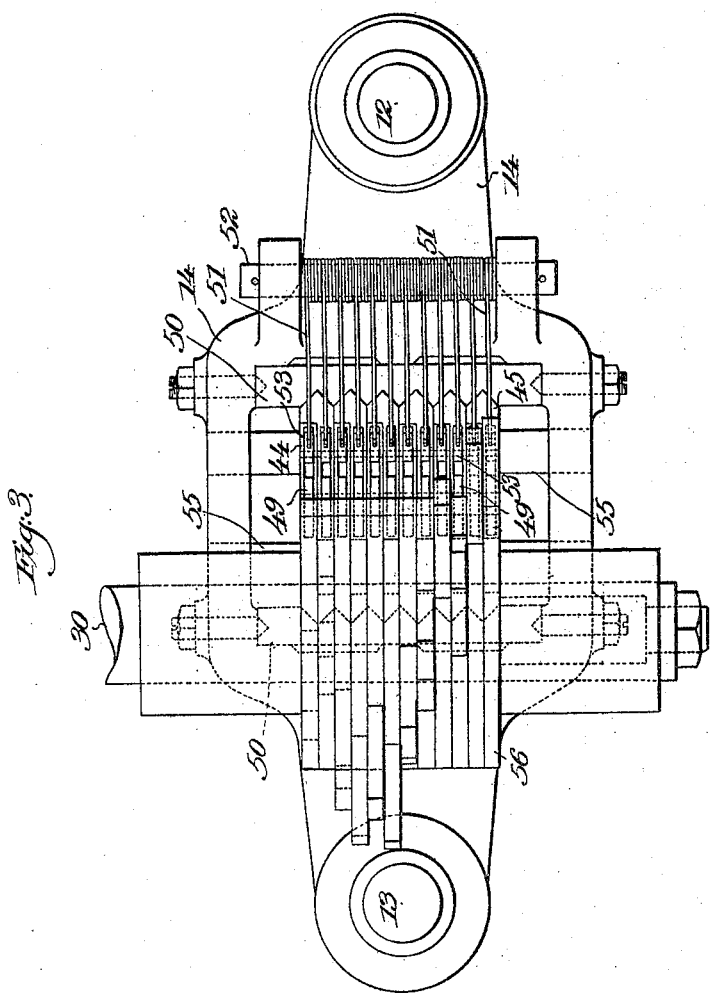
Figure 4:
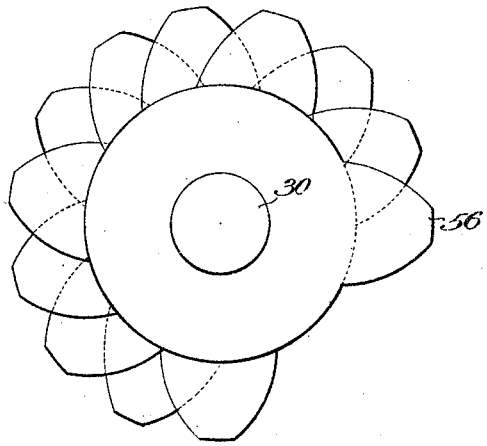
Figure 5:
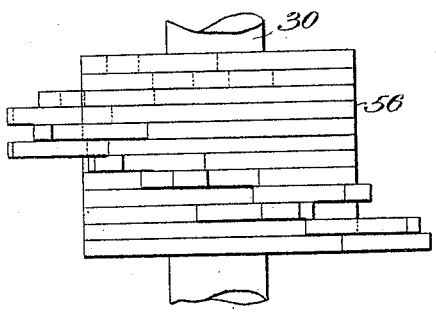
Figure 6:
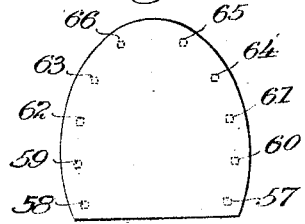

Figure 1 is a view in side elevation of a heel-nailing machine embodying the preferred form of the same. Fig. 2 is a view in front elevation of the cross-head in which the driver-carriers are mounted, the driver-carriers, and other actuating-cams. Fig. 3 is a plan view of that portion of the machine illustrated in Fig. 2. Fig. 4 is a face view of the cams by which the driver-carriers are actuated. Fig. 5 is a plan view of the cams illustrated in Fig. 4. Fig. 6 is a plan view of a heel after the top lift has been attached, indicating in dotted lines the positions of the heel-attaching nails. Fig. 7 is a view in front elevation of two of the driver-carriers which drive corresponding nails upon opposite sides of the heel, showing the positions which the two carriers assume with relation to each other in the machine. Fig. 8 is a view in front elevation of the driver-carrier illustrated in Fig. 7, which drives the nail upon the left side of the heel as viewed in Fig. 6; and Fig. 9 is a view in rear elevation of the driver-carrier illustrated in Fig. 7, which drives the corresponding nail upon the right side of the heel. Fig. 10 is a plan view of the driver-carriers illustrated in Fig. 7. Fig. 11 is a bottom plan view of the top-lift carrier and spanker-plate, and Fig. 12 is a sectional view on the line 12 12 of Fig. 11.

With the exception of the driver-carriers, their actuating-cams, and the sectional spanker-plate the machine illustrated in the drawings is the same in construction, arrangement, and mode of operation as the machine disclosed in my prior application, hereinbefore referred to. Since, however, the general construction and arrangement of the various parts of the machine are illustrated in the drawings accompanying this application, they will be briefly described, reference being had to my prior application and to the patent to Pope, No. 446,885, dated February 24, 1891, referred to therein for a complete disclosure thereof.

The frame of the machine consists of a main portion 1 and a supplementary portion 2, secured to the main portion.

3 indicates the main driving-shaft journaled in the portion 1 of the frame and having loosely mounted thereon a balance-wheel 4, which is provided with an extended hub upon which are mounted fast and loose belt-pulleys 5 and 6. A single revolution-clutch is provided, by means of which the balance-wheel can be clutched to the driving-shaft 3, and this clutch is controlled by means of a lever 7, connected by a link 8 to a hand-lever 9, which extends into a convenient position to be grasped by the operator. Upon the front end of the shaft 3 is secured a cam-disk provided with a cam-rib which is engaged on opposite sides by studs or rolls 10 and 11, mounted upon a cross-head secured to the lower ends of two vertical rods 12 and 13, mounted to reciprocate in bearings in the portion 1 of the frame. Upon the upper ends of the rods 12 and 13 a cross-head 14 is secured, in which the driver-carriers are mounted and which supports the shaft of the cams by which the driver-carriers are actuated. Below the cross-head 14 is a stationary cross-head 15, secured to the upper bearings for the rods 12 and 13 and provided with holes through which the nail-drivers pass.

16 indicates a nail-holder, and 17 a heel-holder, the nail-holder being pivotally mounted upon the upper end of the upper bearing for the rod 12 above the cross-head 15 and the heel-holder being pivotally mounted upon the bearing below the cross-head 15.

18 (see Figs. 11 and 12) indicates a top-lift carrier which is pivotally mounted upon the upper bearing for the rod 13 below the cross-head 15.

A shoe-supporting jack of well-known construction is indicated at 19 and is mounted to slide horizontally in guideways upon the upper surface of a vertically-movable support 20. The support 20 is engaged by a vertical screw-threaded shaft which is provided with a pinion meshing with a rack-bar 21, mounted to slide in horizontal guideways in the main portion of the machine-frame. The rack-bar 21 is connected, by means of a link 22, to one arm of a bell-crank 23, the other arm of which is connected, by means of a link 24, to a lever 25, provided with a foot-treadle 26.

The construction so far described is such that after a shoe has been placed upon the jack and a heel has been placed in the heel-holder 17 and swung into position beneath the cross-head 15 the jack can be moved horizontally upon the support 20 to bring the heel portion of the sole beneath the heel, and the support 20 can be raised vertically by depressing the treadle 26 to bring the sole of the shoe into contact with the heel. When the parts are in this position, the lever 9 is actuated to cause the lever 7 to release the clutch between the balance-wheel 4 and the shaft 3, and the shaft makes one complete revolution. During the revolution of the shaft 3 the cross-head 14 is lowered to bring the nail-drivers into or in close proximity to the holes in the cross-head 15 and is held in this position during one-half of the revolution of shaft 3 and is then returned to its upper position. During the downward movement of the cross-head 14 the support 20 is automatically raised to firmly clamp the heel against the sole of the shoe upon the jack by means of cams which are actuated by levers connected by means of links to collars secured to the rods 12 and 13. One of these cam-actuated levers is indicated in Fig. 1 at 27 and is connected by means of a link 28 to a collar 29, secured to the rod 12.

While the cross-head 14 is in its lowered position the driver-carriers are actuated to cause the drivers to drive the nails. The drivers are actuated by means of a series of cams secured to a shaft 30, mounted in bearings in upwardly-extending projections from the cross-head 14. The shaft 30 is provided at its rear end with a bevel-gear 31, which meshes with a bevel-gear 32, splined upon the upper end of a vertical shaft 33, journaled in bearings in the supplemental portion 2 of the frame. The rear end of the shaft 30 is provided with a roll or stud which engages a groove in the collar of bevel-gear 32, so that during the vertical reciprocating movements of the cross-head 14 the bevel-gear 32 is moved longitudinally on the shaft 33 and kept in mesh with the gear 31. The lower end of the shaft 33 is secured to bevel-gear 34, which meshes with a bevel-gear 35 upon the front end of a horizontal shaft 36, journaled in the supplementary portion 2 of the machine-frames. Also journaled in the portion 2 of the machine-frame in line with the shaft 36 is a shaft 37, which is driven from the main driving-shaft 3 by means of a sprocket-chain 38, passing over sprocket-wheels secured to the shafts, the sprocket-wheels being so proportioned that the shaft 37 makes a complete revolution during one-half of a revolution of the shaft 3. Between the shafts 36 and 37 a clutch is provided which is controlled through suitable connections, being indicated in dotted lines in Fig. 1 and including a rock-shaft 39, provided at one end with an arm through which the device which directly controls the clutch is actuated, and at the other end with an arm which is connected by a link 40 to the pivotal connection of the lever and link at the opposite side of the machine corresponding to the lever 27 and link 28. The clutch between the shafts 36 and 37 is a single-revolution clutch, and the connections for controlling the clutch are such that the clutch is released when the cross-head 14 reaches its lowest position, so that the shafts 36 and 37 are connected while the cross-head 14 is in its lowest position, and the shaft 30 is caused to make a complete revolution before the cross-head begins its upward movement. In order to prevent an overthrow of the shaft 30 when the shafts 36 and 37 are disconnected, a brake-lever 41 is provided, one end of which bears against a cam 42, secured to the shaft 33, and the other end of which is provided with a brake-shoe which bears against a collar 43, secured to the shaft.

In the machine disclosed in my prior application the nail-driver carriers consist of a series of plates mounted to reciprocate in vertical guideways in the cross-head 14, and each plate is provided at its lower end with a number of nail-drivers, the construction and arrangement of the plates and nail-drivers being such that two corresponding nails on opposite sides of the heel are driven by the depression of each plate. In carrying out my present invention I have provided a greater number of reciprocating plates carrying nail-drivers at their lower ends and have so arranged the plates and nail-drivers that the depression of a plate acts to drive but a single nail. I have also correspondingly increased the number of cams upon the shaft 30 for actuating the driver-carrier plates and have arranged the cams in such a manner that the driver-carrier plates are actuated to drive nails successively and singly and to drive nails alternately upon opposite sides of the heel.

The construction and arrangement of the driver-carrier plates is clearly illustrated in Figs. 7, 8, 9, and 10. Referring to these figures, 44 indicates a driver-carrier plate the depression of which acts to drive a nail on one side of the heel, and 45 indicates a driver-carrier plate the depression of which acts to drive the corresponding nail on the other side of the heel. These plates are provided at their lower ends with drivers 46, which pass through and are held in place by plates 47, secured to the lower ends of the plates 44 and 45, the upper ends of the nail-drivers bearing against wear-resisting plates 48. The two plates 44 and 45 when assembled in the machine assume the relative positions illustrated in Fig. 7. The upper ends of the plates are recessed, as illustrated in Figs. 7, 8, 9, and 10, and overlap in order to bring the rolls 49, journaled in the upper ends of the plates, in line. The recesses at the upper ends of the plates are such that the plates can be depressed and raised to their normal position independently of each other. Below their recessed portions the adjacent edges of the plates are in contact, so that one plate forms a guide for the other. The other edges of the plates are V-shaped and are received in corresponding V-shaped vertical guideways in plates 50, secured in an opening in the cross-head 14, as clearly illustrated in Fig. 3. Each plate is normally held in its raised position and is returned to such position after being depressed by means of a spring 51, coiled around a rod 52, secured in lugs projecting upwardly from the cross-head 14, one end of the spring being in engagement with the cross-head and the other end of the spring engaging a pin in the upper end of a link 53, secured to the driver-carrier plate. The driver-carrier plates are provided with vertical elongated slots 54, through which pins 55, secured in the cross-head 14, pass, the pins by engaging with the upper ends of the slots acting to positively withdraw the nail-drivers from the holes in the cross-head 15 during the upward movement of the cross-head 14 in case the springs 51 fail to act.

The cams for depressing the driver-carrier plates while the cross-head is in its lowered position are indicated at 56 and are secured to the shaft 30, so as to rotate therewith. A cam is provided for each driver-carrier plate and is arranged to act upon a roll 49. The relative arrangement of the cams is clearly illustrated in Figs. 2, 3, 4, and 5. From an inspection of these figures it will be apparent that during a single revolution of the shaft 30 the driver-carrier plates are actuated to drive the nails singly and successively and to drive nails alternately on opposite sides of the heel. The order in which the nails are driven is indicated in Fig. 6, in which the nail 57 at the lower right-hand side of the heel is driven first, then the corresponding nail 58 on the opposite side of the heel, then the nail 59 on the same side of the heel as the nail 58, and then the nail 60 on the same side of the heel as the nail 57, the remaining nails being driven in the order indicated by the numerals 61 to 66.

In carrying out that feature of my invention which relates to attaching the top lift I have provided a top-lift holder and a sectional spanker-plate which are moved into a position beneath the cross-head 15 and above the heel of a shoe supported upon the jack. When the top-lift holder and sectional spanker-plate are in this position and the cross-head 14 and the driver-carrier plates are actuated in the same manner as when the heel-attaching nails are driven, the nail-drivers depress the sections of the spanker-plate and force the top lift upon the heads of the heel-attaching nails one at a time, the top lift being forced upon the nails in the same order in which they are driven. The top-lift holder is illustrated separately in Figs. 11 and 12 and is substantially the same in construction as the top-lift holder disclosed in my prior application. This top-lift holder consists of a frame provided with a rectangular opening in which the movable sections of the spanker-plate are mounted. Beneath the frame is a plate 67, pivotally mounted between ears projecting laterally from the frame. This plate is provided with a rectangular opening of less width than the opening in which the sections of the spanker-plate are mounted. The top lift is held in the rectangular opening of the plate 67 by means of a stationary clamping-jaw 68, adjustably secured to the plate, and a coöperating movable clamping-jaw 69. The clamping-jaw 69 is L-shaped, and one arm is mounted to slide in a guide formed in the plate 70, secured to the plate 67. The free end of the other arm of the clamping-jaw 69 is guided between the plate 67 and a plate 71, secured to the plate 67, and is acted upon by a coiled spring 72, one end of which is connected to the clamping-jaw and the other end of which is connected to a bracket 73, adjustably secured to the plate 67. The plate 67 is acted upon by a spring coiled around the pivotal stud of the plate. A bar 74 extends across the longitudinal opening in the frame of the top-lift carrier and divides the opening into two portions. In these two portions of the rectangular opening the sections 75 of the spanker-plate are mounted, there being as many sections as there are nail-driver-carrier plates. The ends of the sections of the spanker-plate adjacent to the bar 74 extend beneath the bar, as illustrated in Fig. 12, so that the sections when depressed act upon all portions of the top lift. The downward movement of the sections of the spanker-plate is limited by means of plates 76, secured to the upper surface of the sections and extending into recesses in the bar 74 and in the sides of the rectangular opening in which the sections are mounted. The upward movement of the sections of the spanker-plate is limited by retaining-plates 77, secured to the main frame of the top-lift holder and to the bar 74. When the top-lift holder and sectional spanker-plate are in position beneath the cross-head 15 above the heel of a shoe supported upon the jack, each section of the spanker-plate is beneath the drivers of a driver-carrier plate, so that when the driver-carrier plates are actuated successively the sections of the spanker-plate are also actuated successively, the plate 67 moving downwardly as the sections of the spanker-plate are depressed and the top lift being forced upon the heads of the heel-attaching nails in the same order in which the nails are driven.

The operation of the various parts of the machine above described, and particularly those parts which embody the present invention, have been indicated in connection with the description of their construction and arrangement and will be readily understood without a separate description thereof.

Having thus indicated the nature and scope of my invention and having particularly described a construction embodying the same in its preferred form, I claim as new and desire to secure by Letters Patent—

1. A heel-nailing machine, having, in combination, a shoe-supporting jack and means for driving heel-attaching nails alternately on opposite sides of the heel, substantially as described.

2. A heel-nailing machine, having, in combination, a shoe-supporting jack and means for driving the heel-attaching nails on each side of the heel singly and alternately on opposite sides of the heel, substantially as described.

3. A heel-nailing machine, having, in combination, a shoe-supporting jack, a driver-carrier for driving each heel-attaching nail, drivers carried thereby, and means for actuating said driver-carriers to drive nails alternately on opposite sides of the heel, substantially as described.

4. A heel-nailing machine, having, in combination, a shoe-supporting jack, a sectional spanker-plate provided with a section for each heel-attaching nail, and means for actuating the sections of the spanker-plate successively to attach the top lift, substantially as described.

5. A heel-nailing machine, having, in combination, a shoe-supporting jack, a driver-carrier for driving each heel-attaching nail, drivers carried thereby, a sectional spanker-plate movable into a position between the drivers and a shoe supported upon the jack, and means for actuating said driver-carriers successively, substantially as described.

6. A heel-nailing machine, having, in combination, a shoe-supporting jack, and means for forcing the top lift upon the heel-attaching nails successively one nail at a time, substantially as described.

In testimony whereof I affix my signature in presence of two witnesses.

HENRY BRIGGS.

Witnesses:
FRED O. FISH,
ALFRED H. HILDRETH.